Patented June 2, 1942

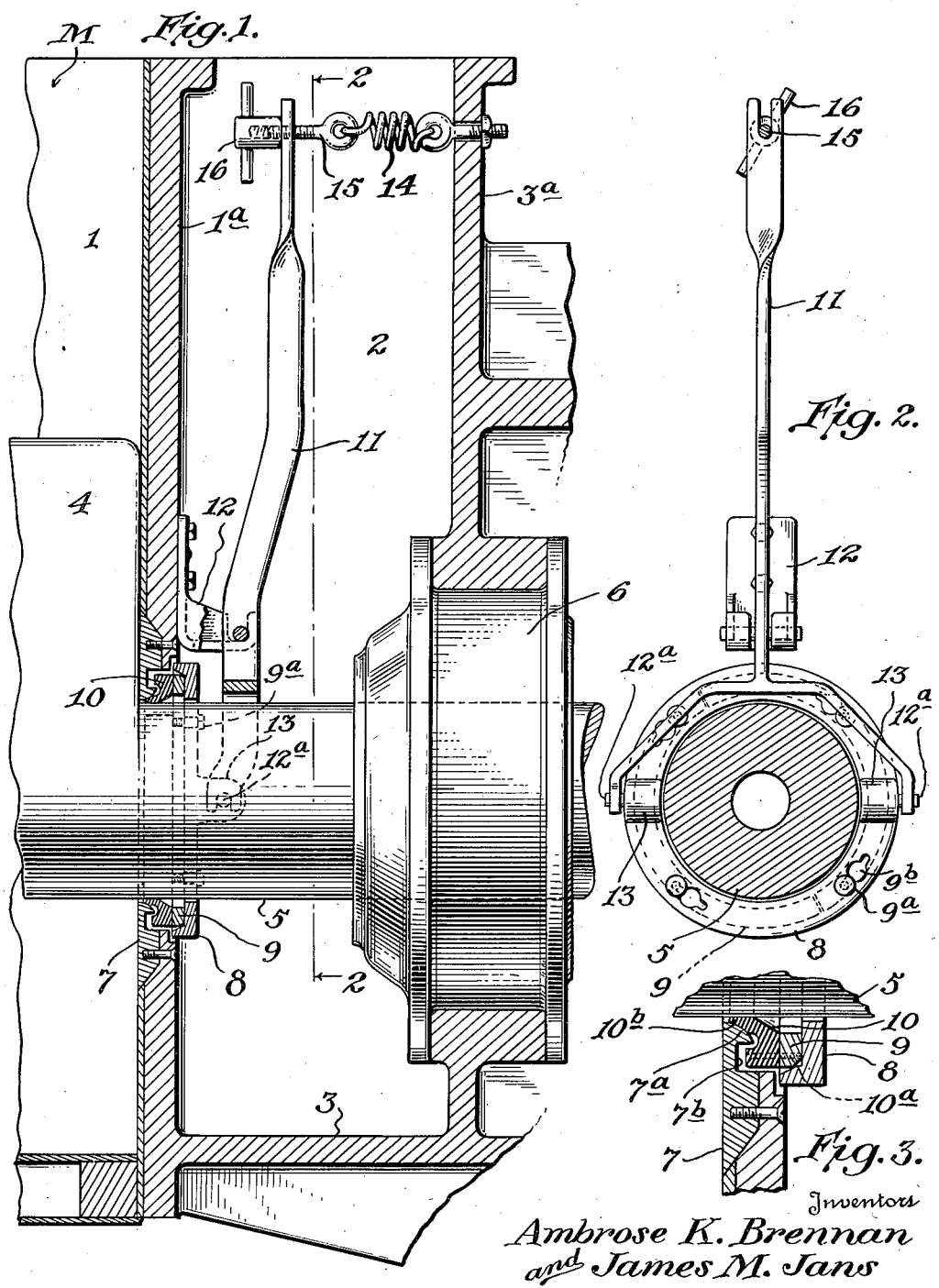

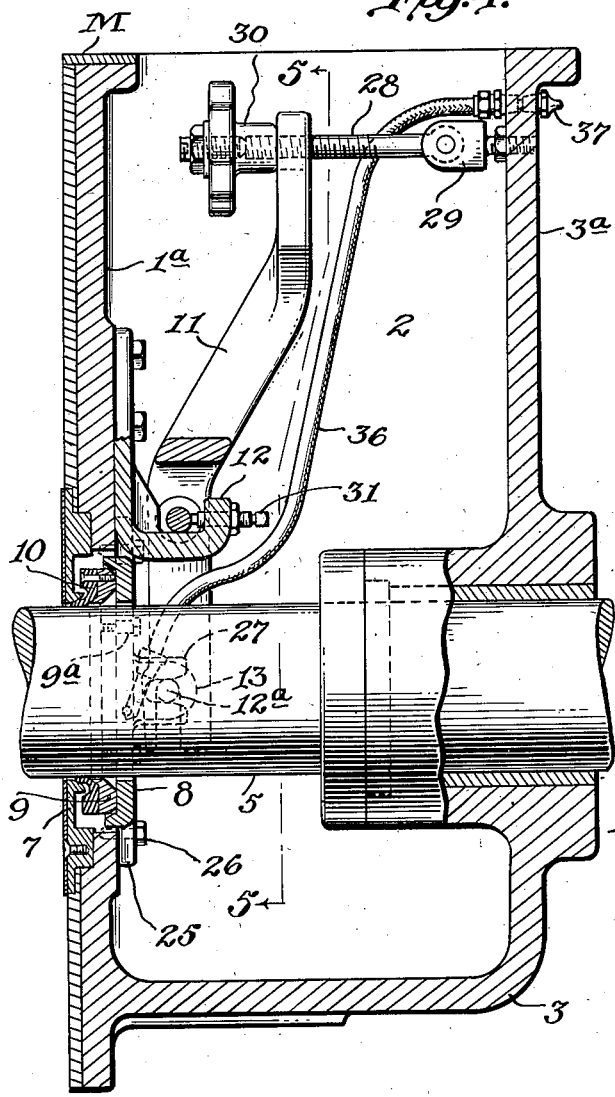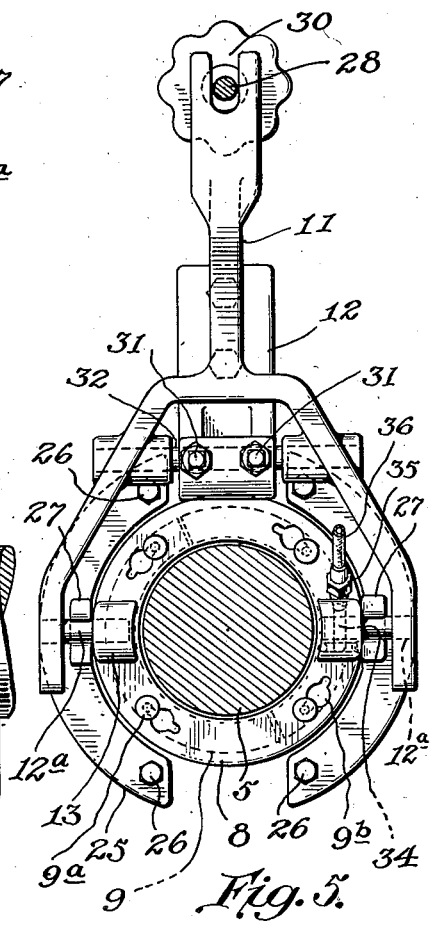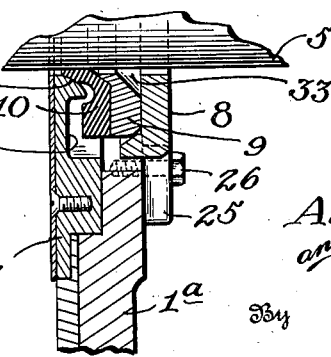

2,285,007

UNITED STATES PATENT OFFICE 2,285,007

SHAFT SEAL

Ambrose K. Brennan, York, Pa., and James M. Jans, Moorestown, N. J., assignors to Read Machinery Company, Inc., York, Pa., a corporation of Pennsylvania Application June 13, 1940, Serial No. 341,204

5 Claims. (Cl. 286—32)

This invention relates to shaft seals especially suited, although not restricted, for use in connection with vacuum or pressure type mixers to close the clearance around an agitator shaft where it extends through the end walls of the mixing chamber into a vacuum or pressure compartment located contiguous thereto. This application is a continuation-in-part of our application Ser. No. 267,504, which issued as Patent No. 2,209,559 on July 30, 1940.

More particularly the invention aims to provide a shaft seal of the above character which is adapted to be wedged into engagement with the agitator shaft and including a pivoted lever, conveniently accessible from the top of the mixer for manually adjusting the pressure on the sealing member to compensate for wear.

Another object of the invention is to provide a shaft seal of the above character in which the packing ring which frictionally engages the agitator shaft may be quickly and easily removed for cleaning or for replacement when it becomes worn.

Still another object of the invention is to provide a shaft seal of the above character which includes a reservoir for lubricant surrounding the agitator shaft for lubricating the packing ring, with means for replenishing the supply of lubricant in the reservoir without disassembling the seal.

Other objects and advantages will be apparent from the following detailed description of a preferred embodiment of the invention, reference being had to the annexed drawings, in which:

Figure 1 is a vertical cross-sectional view through an end of a vacuum type mixer showing a sealing member surrounding an agitator shaft;

Figure 2 is an elevational view of the sealing member viewed in the direction indicated by the line 2—2 of Fig. 1;

Figure 3 is a fragmentary detail view, in cross-section, of the sealing member;

Figure 4 is a vertical cross-sectional view, corresponding to the view of Fig. 1, of a slightly modified form of sealing member;

Figure 5 is an elevational view of the sealing member, viewed in the direction indicated by the line 5—5 of Fig. 4; and Figure 6 is a fragmentary detail view, in cross-section, of the sealing member of Fig. 4.

In Fig. 1 is illustrated in cross-section one end of a mixing machine M of the vacuum type including a mixing chamber 1, closed at one end by an end wall 1a, and a vacuum compartment 2 provided by a hollow casting 3 contiguous to the end wall of the mixing chamber. One of the agitators mounted for rotation within the mixing chamber is indicated at 4, and this agitator is supported at each of its ends by a shaft 5 extending through an opening in the end wall 1a and being journaled in a roller bearing 6 mounted in an upright wall 3a of casting 3.

Bolted to the end wall 1a inside the mixing chamber and surrounding the shaft 5 is an annular closure plate 7. This closure plate is provided with a beveled inner circumference 7a (best shown in Fig. 3), disposed adjacent the shaft and expanding toward the vacuum compartment, and with a circular groove 7b formed within its rear face. The beveled inner circumference 7a of the closure plate forms with the shaft 5 a convergent or V-shaped recess surrounding the shaft. A sealing member is adapted to cooperate with this closure plate to seal the clearance between the inner circumference of the closure plate and the outer circumference of the shaft. The sealing member comprises a sealing ring 8 located within the vacuum compartment and surrounding the shaft 5. Affixed to the face of the sealing ring disposed toward the closure plate 7, is a transversely split collar 9, the two sections of which are detachably connected to the sealing ring by means of a series of headed pins 9a on the collar extending into companion keyhole slots 9b (Fig. 2) formed in the sealing ring.

To the collar 9 is fastened a transversely split packing ring 10 by screws 10a, this packing ring preferably being made of a flexible composition. The outer face of the packing ring is channeled to produce an elongated lip 10b which bears against the beveled edge 7a of the closure plate 7.

For yieldingly urging this sealing member into closing relationship with reference to the clearance surrounding the shaft 5, a lever 11 is provided. This lever is pivoted intermediate its ends in a bracket 12 fastened to the outer face of the end wall 1a of the mixing receptacle. The lower end of the lever is forked so as to bridge shaft 5 and each branch of the fork is slotted so as to fit over a pin 12a provided by each of a pair of ears 13 on the sealing ring 8.

The upper end of the lever is urged by a coil spring 14, connected to the wall 3a of the vacuum compartment, in a direction such as to rock the lever about its pivotal support in bracket 12 and force the sealing ring into contact with the closure plate 7, and consequently to cause the beveled edge of the sealing plate to deflect the lip 10b of the packing ring into the convergent recess surrounding the shaft and into tight engagement with the shaft 5. The upper end of the lever 11 is twisted at right angles and slotted so as to straddle an eyebolt 15, which eyebolt, in turn, is threaded into a nut 16 engaging a face of the lever.

By virtue of the above construction, the pressure exerted by the sealing member against the closure plate 7 may be varied by simply rotating the nut 16 to screw the eyebolt 15 inwardly or outwardly of the nut, thereby changing the tension of the coil spring 14. When it is desired to remove the packing ring for cleaning or renewal, it is only necessary to detach the lever 11 from the eyebolt 15 and then lift the lever from the bracket 12 and out of the vacuum compartment. The sealing ring 8 is then slid along the shaft 5, and by rotating the collar 9 and packing ring 10 until the heads of pins 9a register with the enlarged portions of the keyhole slots 9b, the two half-sections of the combined collar and packing ring may be separated to permit their removal from around the shaft 5. The packing ring may then be detached from the collar (by withdrawing the screws 10a) for cleaning or renewal of the packing ring.

The parts are assembled by simply reversing the order of the above steps. The opening in the wall at opposite ends of the mixer (not shown) through which the agitator shaft 5 passes from the mixing chamber into the vacuum compartment is provided with sealing means corresponding to those just described.

A cover (not shown) is designed to close the top of the mixing chamber 1 and vacuum compartments 2, this cover rendering the mixing chamber and vacuum compartments air-tight and providing a restricted communicating passage therebetween. As more fully described in our copending application previously referred to, during operation of the mixer gases are continuously exhausted from the mixing chamber 1 and also, through the communicating passages, from the vacuum compartments 2 so as to maintain a sub-atmospheric pressure in chamber and compartments.

The seals provided by the members 8 are effective to prevent foreign matter from entering the mixing chamber and contaminating the product undergoing mixing, and such small leakage of air as may occur past these seals from the vacuum compartments into the mixing chamber aids in preventing leakage of the product out of the mixing chamber.

In Figs. 4, 5 and 6 is illustrated a slightly modified form of shaft seal. In these figures the same reference numerals are employed to designate parts corresponding to those of the seal of Figs. 1, 2 and 3. The seal comprises an annular closure plate 7 surrounding the agitator shaft 5 and secured to the inner face of the mixing chamber, this closure plate having a beveled inner circumference 7a and a circular groove 7b formed upon its rear face. Cooperating with this closure plate is a sealing member located inside the vacuum compartment 2 and comprising a sealing ring 8 surrounding the agitator shaft 5, a transversely split collar 9 having its two half-round sections detachably connected to the sealing ring, and a transversely split packing ring 10 secured to the split collar.

For urging the sealing member into engagement with the closure plate, a lever 11 is pivotally supported upon a bracket 12 fastened to the end wall 1a of the mixing chamber, the lower end of this lever being forked so as to straddle the agitator shaft and each fork being slotted at its end so as to fit over a pin 12a provided by each of a pair of ears 13 on the sealing ring 8.

So much of the shaft seal as has thus far been described corresponds in all substantial respects to the shaft seal of Figs. 1, 2, and 3, previously set forth in greater detail. The principal features of this modified form of seal will now be described.

Within the vacuum compartment 2 partially surrounding the sealing ring 8 is a pair of arcuate shaped plates 25. These plates are attached to the wall 1a by bolts 26 and provide a pair of slotted lugs 27 projecting into the space between the forked ends of lever 11 and the ears 13 on the sealing ring 8. The slots in the lugs 27 slidably receive the pins 12a by which the lever is operatively connected to the sealing ring so that the resistance to rotation of the sealing ring is assumed by the lugs 27 instead of by the lever.

The upper end of the lever 11 which extends to a position adjacent the top of the vacuum compartment is slotted so as to straddle the normally horizontal, screw-threaded end of an eyebolt 28. The eye of the eyebolt is pivoted to a stud 29 screwed to the wall 3a of casting 3, the arrangement being such that the eyebolt is free to swing in a vertical plane. A manually adjustable nut 30 is threaded upon the end of the eyebolt which projects beyond the lever, this nut abutting the lever so that by turning the nut in one direction the lever is rocked upon the bracket 12 to force the sealing member more tightly into engagement with the closure plate 7 and thereby to urge the lip 7a of the packing ring more firmly into contact with the circumference of the agitator shaft 5. In order to provide for the more accurate adjustment of the sealing member, the bracket is provided with a pair of set screws 31 which engage a cross pin 32 extending between the forks of the lever and resting upon the bracket 12. By means of the set screws 31 the position of the cross pin, which provides the pivotal support for the lever, may be adjusted a limited distance in a horizontal direction to take up play.

In order to lubricate the packing ring 10 and to close the minute space between the packing ring and shaft, the following means are provided: The split collar 9 is of enlarged diameter throughout a portion of its inner circumference so as to provide a storage space 33 (Fig. 6) surrounding the shaft 5, this space being substantially closed at one end by the sealing ring 8. A passage 34 through the sealing ring leads from the storage space 33 to the exterior of the sealing ring and communicates with a coupling 35. A flexible tube 36 extends from the coupling to a fitting 37 passing through the wall 3a of the vacuum compartment and affording means upon the exterior of the apparatus to receive a grease gun. By maintaining the storage space 33 filled with grease, the resulting ring of lubricant lubricates the packing ring 7 and the supply of grease may be replenished without interrupting the operation of the mixer.

The modified form of shaft seal just described operates in substantially the same manner as the shaft seal described in connection with Figs. 1, 2 and 3. Both forms of seals are especially suitable for use in connection with vacuum type mixers to prevent leakage of air, gas, dirt or liquids between the vacuum compartments and the mixing chamber, although manifestly their utility is not limited to any special type of apparatus.

While in the example described above the shaft seal is applied to a vacuum type mixer, it is to be understood that its utility is not restricted to such a type of mixer. For example, it will serve to equally good advantage in connection with a mixer of the pressure type, that is a mixer in which air under pressure is introduced into the mixing chamber. In either event the seal serves to effectively close the clearance around an agitator shaft.

It will be understood that the invention is not limited to the exact details of construction and operation herein shown and described, for various modifications within the scope of the claims may occur to persons skilled in the art.

We claim:

1. A shaft seal for mixers of the type including a mixing chamber and a rotatable agitator shaft extending through an oversize opening in an end wall of the mixing chamber, said shaft seal comprising a closure plate secured to said end wall at said opening and encircling the shaft, said closure plate having a tapered inner circumference defining with the agitator shaft a convergent recess surrounding the shaft, a pivotally-mounted lever located upon the opposite side of the end wall from the closure plate, a flexible packing member secured to said lever, said packing member having an elongated annular lip projecting from one side thereof and engaging the tapered inner circumference of the closure plate, and means for moving said lever about its pivotal mounting in a direction such as to urge the lip into the convergent recess and deflect said lip into frictional engagement with the shaft.

2. A shaft seal for mixers of the type including a mixing chamber and a rotatable agitator shaft extending through an oversize opening in an end wall of the mixing chamber, said shaft seal comprising a closure plate secured to said end wall at said opening and encircling the shaft, said closure plate having a tapered inner circumference defining with the agitator shaft a convergent recess surrounding the shaft, a pivotally-mounted lever located upon the opposite side of the end wall from the closure plate, a flexible packing member secured to said lever, said packing member having an elongated annular lip projecting from one side thereof and engaging the tapered inner circumference of the closure plate, the engagement between said packing member and closure plate being solely along the tapered inner circumference of the closure plate, and means for moving said lever about its pivoted mounting in a direction such as to urge the lip into the convergent recess and deflect said lip into frictional engagement with the shaft.

3. A shaft seal for mixers of the type including a mixing chamber and a rotatable agitator shaft extending through an oversize opening in an end wall of the mixing chamber, said shaft seal comprising a closure plate secured to said end wall at said opening and encircling the shaft, said closure plate having a tapered inner circumference defining with the agitator shaft a convergent recess surrounding the shaft, a pivotally-mounted lever located upon the opposite side of the end wall from the closure plate, a flexible packing member secured to said lever, said packing member having an elongated annular lip projecting from one side thereof and engaging the tapered inner circumference of the closure plate, said lever having a forked end bridging the agitator shaft, a sealing ring encircling the shaft and detachably connected to the forked end of the lever, a split collar detachably connected to said sealing ring, means securing said packing member to said collar, and means for moving said lever about its pivotal mounting in a direction such as to urge the lip into the convergent recess and deflect said lip into frictional engagement with the shaft.

4. A shaft seal for mixers of the type including a mixing chamber and a rotatable agitator shaft extending through an oversize opening in an end wall of the mixing chamber, said shaft seal comprising a closure plate secured to said end wall at said opening and encircling the shaft, said closure plate having a tapered inner circumference defining with the agitator shaft a convergent recess surrounding the shaft, a pivotally-mounted lever located upon the opposite side of the end wall from the closure plate, said lever having a forked lower end bridging said agitator shaft, a sealing ring encircling the agitator shaft, a pin-and-slot connection between said sealing ring and forked end of said lever, a flexible packing member secured to said sealing ring, said packing member having an elongated annular lip projecting from one side thereof and engaging the tapered inner circumference of the closure plate, a bracket pivotally supporting said lever, a pin-and-slot connection between said bracket and lever, the arrangement being such that by bodily moving the lever in one direction removes the pins from the slots in said bracket and sealing ring, and means for moving said lever about its pivotal mounting in a direction such as to urge the lip into the convergent recess and deflect said lip into frictional engagement with the shaft.

5. A shaft seal for mixers of the type including a mixing chamber and a rotatable agitator shaft extending through an oversize opening in an end wall of the mixing chamber, said shaft seal comprising a closure plate secured to said end wall at said opening and encircling the shaft, said closure plate having a tapered inner circumference defining with the agitator shaft a convergent recess surrounding the shaft, a pivotally-mounted lever located upon the opposite side of the end wall from the closure plate, a flexible packing member secured to said lever, said packing member having an elongated annular lip projecting from one side thereof and engaging the tapered inner circumference of the closure plate, a sealing ring encircling the shaft and detachably connected to the lever, a collar attachably connected to said sealing ring, means securing said packing member to said collar, the inner diameter of said collar being larger than the inner diameters of said packing member and sealing ring so as to provide an annular lubricant storage space surrounding the agitator shaft, a flexible tube having one end communicating with said lubricant storage space and provided with means at its other end for connection with a grease gun, and means for moving said lever about its pivotal mounting in a direction such as to urge the lip into the convergent recess and deflect said lip into frictional engagement with the shaft.

AMBROSE K. BRENNAN.
JAMES M. JANS.